United States Patent [19]
Grenon et al.

[11] Patent Number: 5,349,262
[45] Date of Patent: Sep. 20, 1994

[54] PHASED ARRAY ULTRASOUND IMAGING SYSTEM WITH DYNAMIC ELEVATION FOCUSING

[75] Inventors: Stephen M. Grenon, Manchester; Gregory G. Vogel, Londonderry, both of N.H.

[73] Assignee: Hewlett-Packard Company, Palo Alto, Calif.

[21] Appl. No.: 199,918

[22] Filed: Feb. 22, 1994

[51] Int. Cl.$^5$ .............................. H01L 41/08
[52] U.S. Cl. .................. 310/334; 310/335; 128/663.01
[58] Field of Search .............. 310/334–337; 128/660.01, 662.03, 663.01

[56] References Cited

U.S. PATENT DOCUMENTS

| | | | |
|---|---|---|---|
| 4,242,912 | 1/1981 | Burckhardt et al. | 310/334 X |
| 4,359,767 | 11/1982 | Sachs et al. | 367/105 |
| 4,460,841 | 7/1984 | Smith et al. | 310/334 |
| 4,670,683 | 6/1987 | 't Hoen | 310/334 |
| 5,105,814 | 4/1992 | Drukarey et al. | 128/660.07 |
| 5,115,810 | 5/1992 | Watanabe et al. | 128/662.03 |
| 5,237,542 | 8/1993 | Burke et al. | 310/334 X |
| 5,250,869 | 10/1993 | Ishikawa et al. | 310/334 |
| 5,285,789 | 2/1994 | Chen et al. | 128/662.03 |

OTHER PUBLICATIONS

"A Segmented Aperture Approach to High Resolution NMMW Imaging", David E. Schmieder et al, Georgia Institute of Technology, date unknown.

*Primary Examiner*—Mark O. Budd

[57] ABSTRACT

A phased array ultrasound imaging system includes a transducer with multiple transducer elements disposed along a lateral axis. The transducer has an aperture with an elevation dimension parallel to an elevation axis that increases between the midpoint of the aperture along the lateral axis and the ends of the aperture along the lateral axis. The elevation dimension can increase continuously and/or in steps between the midpoint and each end of the aperture. Portions of the aperture can have a constant elevation dimension. When the transducer is used in an ultrasound imaging system, an active receive aperture dynamically increases in size during reception of ultrasound energy from progressively increasing depths, thereby providing dynamic elevation focusing. The transmit aperture size can be selected to optimize both lateral and elevation focii. Electronic compensation can be used to control the transmit and receive beam patterns.

20 Claims, 4 Drawing Sheets

PHASED ARRAY ULTRASOUND IMAGING SYSTEM WITH DYNAMIC ELEVATION FOCUSING

FIELD OF THE INVENTION

This invention relates to ultrasound imaging systems which utilize phased array beam steering and focusing and, more particularly, to an ultrasound transducer configuration which facilitates dynamic elevation focusing, as well as dynamic focusing in the lateral direction.

BACKGROUND OF THE INVENTION

In a phased array ultrasound imaging system, an ultrasound transducer includes an array of transducer elements. The system includes a multiple channel transmitter and a multiple channel receiver connected to the transducer. Each transmitter channel causes a selected transducer array element to transmit an ultrasound pulse into an object being imaged, typically the human body. The transmitted ultrasound energy is steered and focused by applying appropriate delays to the pulses transmitted from each transducer array element, so that the transmitted energy adds constructively at a desired focal point. The ultrasound energy is partially reflected back to the transducer array by various structures and tissues in the body.

Steering and focusing of the received ultrasound energy are effected in a reverse manner. The reflected ultrasound energy from an object or structure arrives at the array elements at different times. The received signals are amplified and delayed in separate receiver channels and then summed in a receive beamformer to form a receive beam. The delay for each channel is selected such that the receive beam is steered at a desired angle and focused at a desired depth. The delays may be varied dynamically so as to focus the beam at progressively increasing depths along a scan line as the ultrasound energy is received. The transmitted beam is scanned over a region of the body, and the signals generated by the beamformer are processed to produce an image of the region.

In order to obtain the highest quality image, both the transmit beam and the receive beam should be focused at each point in the area being imaged. However, the time required to obtain an image in this manner would be prohibitive. In most prior art systems, the transmit beam is typically focused at a single focal depth, and the receive beam is dynamically focused only in azimuth, the direction perpendicular to the divisions between elements of the transducer array. For both transmit and receive beams, the elevation focus is established by an ultrasound lens mounted on the transducer. As a result, the transmit beam is out of focus at points displaced from the transmit focal point, and the receive beam is out of focus in the elevation direction except at a fixed focal point. These factors cause portions of the image displaced from the focal points to be degraded in quality. U.S. Pat. Nos. 4,359,767 and 4,670,683 disclose ultrasound transducers having rows and columns of transducer elements. The disclosed transducer configurations are stated to permit elevation focusing at different depths.

U.S. application Ser. No. 08/006,084, filed Jan. 19, 1993 and assigned to the assignee of the present application, discloses an ultrasound transducer having rows and columns of transducer elements. Two or more ultrasound pulses are transmitted at the same steering angle, but at different focal depths. The received signals in the region of each transmit focal point are "spliced" together to form a single receive line at each steering angle. The transmitted pulses are focused both in elevation and azimuth by energizing different transducer elements at different focal depths.

SUMMARY OF THE INVENTION

In accordance with one aspect of the invention, a phased array ultrasound transducer comprises a plurality of transducer elements disposed along a lateral axis, the transducer having an aperture with an elevation dimension parallel to an elevation axis that increases between the midpoint of the aperture along the lateral axis and each end of the aperture along the lateral axis.

In a first embodiment of the ultrasound transducer, the elevation dimension of the aperture increases continuously between the midpoint of the aperture and each end of the aperture. In a second embodiment of the ultrasound transducer, the elevation dimension of the aperture increases continuously in a portion near the midpoint of the aperture and is constant near each end of the aperture. In a third embodiment of the ultrasound transducer, the elevation dimension of the aperture increases in one or more steps between the midpoint of the aperture and each end of the aperture. In a fourth embodiment of the ultrasound transducer, the elevation dimension of the aperture increases linearly between the midpoint of the aperture and each end of the aperture. The upper and lower boundaries of the aperture can include curved portions, linear portions, stepped portions, portions of constant elevation dimension, and combinations thereof. The general requirement is that the elevation dimension increase between the midpoint of the aperture and each end of the aperture.

According to another aspect of the invention, a phased array ultrasound scanner comprises a phased array ultrasound transducer including a plurality of transducer elements disposed along a lateral axis, the transducer having an aperture with an elevation dimension parallel to an elevation axis that increases between the midpoint of the aperture along the lateral axis and each end of the aperture along the lateral axis, a transmitter for transmitting ultrasound energy with the transducer along a transmit line, and a receiver for receiving reflected ultrasound energy with an active receive aperture of the transducer and for forming a receive beam.

In a preferred embodiment, the receiver includes means for dynamically increasing the number of transducer elements in the active receive aperture such that the active receive aperture effectively increases in elevation dimension. The receive beam is dynamically focused in elevation during reception of reflected ultrasound energy from progressively increasing depths.

The transmitter can include means for transmitting ultrasound energy with a first active transmit aperture of the transducer at a first focal depth and for transmitting ultrasound energy with a second active transmit aperture at a second focal depth. The number of elements utilized in each transmit aperture is selected to optimize both the lateral and elevation focus at the selected sample depth.

According to a further feature of the invention, the receiver can include means for electronically reducing received signals from transducer elements near the ends of the aperture relative to received signals from transducer elements near the midpoint of the aperture in order to compensate for increased sensitivity of the transducer elements near the ends of the aperture.

According to still another feature of the invention, the transmitter can include means for electronically reducing transmitted ultrasound energy from transducer elements near the ends of the aperture relative to transmitted ultrasound energy from transducer elements near the midpoint of the aperture in order to compensate for increased output of transducer elements near the ends of the aperture.

BRIEF DESCRIPTION OF THE DRAWINGS

For a better understanding of the present invention, reference is made to the accompanying drawings which are incorporated herein by reference and in which.

DETAILED DESCRIPTION

Figure 1A:
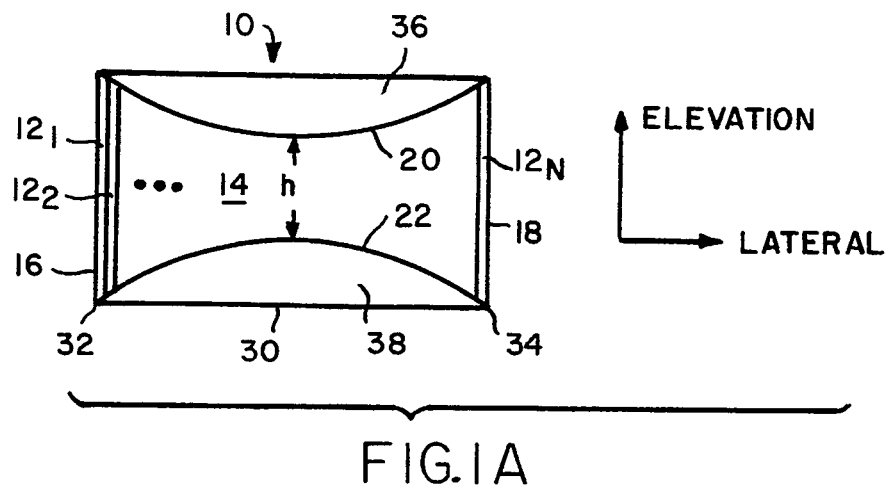
FIG. 1A is a front schematic view of a phased array ultrasound transducer in accordance with a first embodiment of the invention.

A first embodiment of a phased array ultrasound transducer 10 in accordance with the present invention is shown schematically in FIG. 1A. The transducer 10 is typically used for both transmission and reception of ultrasound energy. The transducer includes a plurality of transducer elements $12_1, 12_2, \ldots 12_N$. The transducer elements $12_1, 12_2, \ldots 12_N$ are eisposed side-by-side in a lateral direction, as shown in FIG. 1A, to form an array. As shown, the lateral direction is the direction perpendicular to the divisions between transducer elements. The number N of transducer element depends on the application, but is typically in the range of about 64 to 256. In contrast to elevation focusing transistors which include a column of transducer elements at each location along the lateral axis, the transducer 10 of the present invention includes only a single transducer at each location along the lateral axis.

The transducer elements $12_1, 12_2, \ldots 12_N$ are typically formed by dividing a transducer substrate into multiple elements. The dividing of the transducer into elements may be accomplished by providing properly segmented electrodes for a unitary block of transducer material, or the elements may be formed by scoring or otherwise forming individual transducer elements utilizing procedures known in the art. Techniques for fabrication of phased array ultrasound transducers are generally known in the art and will not be described in detail, except as to the features that are unique to the present invention.

In accordance with the invention, the transducer 10 has an aperture shape which provides highly advantageous operation in phased array ultrasound imaging. The aperture is the area of the transducer 10 through which ultrasound energy is transmitted and received. In the transducer 10 shown in FIG. 1A, an aperture 14 is defined by a left boundary 16, a right boundary 18, an upper boundary 20 and a lower boundary 22. The left boundary 16 and the right boundary 18 are typically straight lines. The upper and lower boundaries 22 are configured such that an elevation dimension h of aperture 14 increases between the midpoint 30 and the ends 32 and 34 of aperture 14. The elevation dimension h is the dimension of the aperture 14 in an elevation direction perpendicular to the lateral direction.

The transducer 10 shown in FIG. 1A is known as a "bowtie" transducer because of its resemblance to a bowtie. An ultrasound lens (not shown) is preferably positioned over the transducer 10. The ultrasound lens is used to provide fixed focusing in the elevation direction and typically has a convex cross-section in the elevation direction. Ultrasound energy is transmitted and received through aperture 14 or a portion of aperture 14. A region 36 of transducer 10 above upper boundary 20 and a region 38 below lower boundary 22 transmit and receive little or no ultrasound energy. In principle, regions 36 and 38 could be eliminated from the transducer 10. However, in a preferred embodiment, the transducer 10 employs a rectangular array of transducer elements with regions 36 and 38 covered by a blocking material to prevent the transmission and reception of ultrasound energy. The use of the blocking material is discussed in more detail below.

Figure 1B:
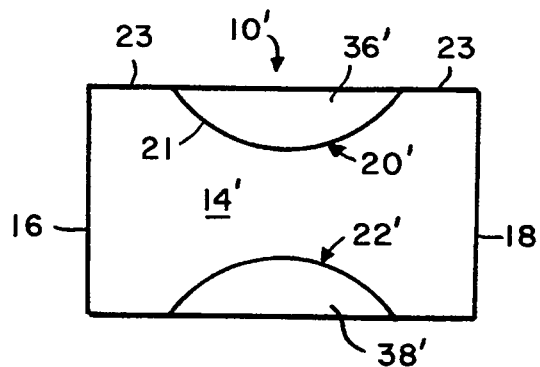
FIG. 1B is a front schematic view of a phased array ultrasound transducer in accordance with a second embodiment of the invention.

In the embodiment of FIG. 1A, the elevation dimension h increases continuously between the midpoint 30 and each end 32, 34 of aperture 14. The upper boundary 20 and the lower boundary 22 of aperture 14 can, for example, be arcs of a circle. A second embodiment of the transducer in accordance with the invention is shown in FIG. 1B. A transducer 10' has an aperture 14' that is defined by left boundary 16, right boundary 18, upper boundary 20' and lower boundary 22'. In the embodiment of FIG. 1B, the upper and lower boundaries 20' and 22' each include a curved portion 21 near the midpoint of aperture 14', in which the elevation of aperture 14' increases with distance from the midpoint of the transducer, and portions 23 near the ends of aperture 14' with a constant elevation dimension. In a preferred embodiment, curved portion 21 is an arc of a circle, and four to six transducer elements near each end of the aperture 14' have the full elevation dimension.

In one example of the bowtie transducer, the transducer aperture was shaped as shown in FIG. 1B. The transducer in this example has 96 elements, with an aperture dimension in the lateral direction of 20.5 mm. The elevation dimension h varies from 8 mm at the midpoint of aperture 14 to 12 mm at the ends.

Figure 8:
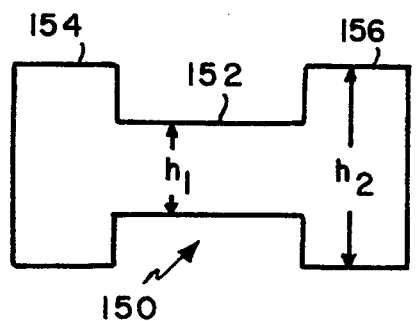
FIG. 8 is a front schematic view of a phased array ultrasound transducer aperture in accordance with a third embodiment of the invention.
Figure 9:
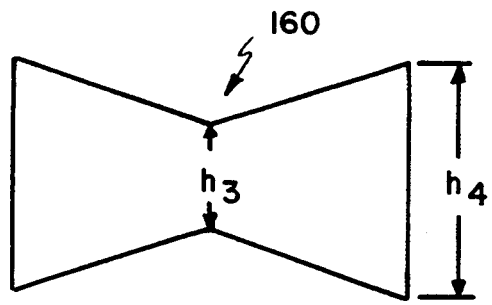
FIG. 9 is a front schematic view of a phased array ultrasound transducer aperture in accordance with a fourth embodiment of the invention.

Additional embodiments of the transducer of the invention are shown in FIGS. 8 and 9 and described below. The embodiment of FIG. 8 has a stepped configuration, and the embodiment of FIG. 9 has a linear variation in elevation dimension.

In general, the upper boundary 20 and the lower boundary 22 of the transducer aperture may have any desired shape which produces a larger elevation dimension at the ends of the transducer than at the midpoint. Furthermore, the upper and lower boundaries may have different shapes. Thus, the upper and lower boundaries of the transducer aperture may be curved, linear, stepped, and combinations thereof. Furthermore, portions of the transducer aperture may have a constant elevation dimension. The shape of the aperture is selected to produce desired beam shapes at operating depths of interest.

When transmitting and receiving ultrasound energy, less than the full transducer aperture may be utilized as described below. This is accomplished by enabling only selected transducer elements. To avoid confusion, the phrase "active transmit aperture" is used to refer to the portion of the transducer aperture that is used for transmitting ultrasound energy. The phrase "active receive aperture" is used to refer to the portion of the transducer aperture that is used for receiving ultrasound energy.

Operation of the ultrasound transducer of the invention is discussed below with reference to FIG. 1A. It will be understood by those skilled in the art that the discussion also applies to the embodiments of FIGS. 1B, 8 and 9 and to other embodiments with the scope of the invention, with appropriate modifications to account for the different shapes of the transducer apertures.

Operation of the bowtie transducer is illustrated with reference to FIG. 2, which shows the aperture 14 of transducer 10. Ultrasound energy is transmitted through an active transmit aperture, which may include all or only some of the transducer elements. Similarly, an active receive aperture for reception of ultrasound energy may include all or selected ones of the transducer elements. Since all of the transducer elements receive ultrasound energy, the active receive aperture is defined by attenuating or inhibiting the received signals from transducer elements outside the active receive aperture.

Operation of the transducer 10 is as follows. A selected group of transducer elements transmits ultrasound energy into an object being imaged. More specifically, each selected transducer element transmits an ultrasound pulse. The transmitted ultrasound energy is steered and focused by applying appropriate delays to the pulses transmitted from the transducer elements, so that the transmitted energy adds constructively at a desired focal depth. The ultrasound energy is partially reflected back to the transducer by various structures and tissues in the body.

Figure 2:
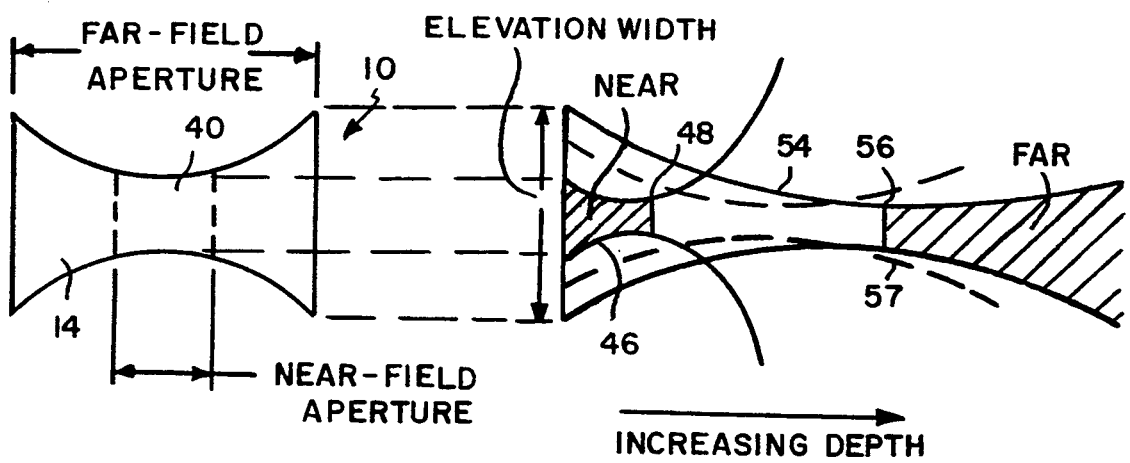
FIG. 2 illustrates the near and far field apertures and the corresponding beam patterns in the elevation direction for the ultrasound transducer of FIG. 1A.

The reception of ultrasound energy using dynamic receive focusing is illustrated in FIG. 2. After transmission of ultrasound energy, the transducer 10 receives reflected ultrasound energy from progressively increasing depths. As will be described, the receive beam is dynamically focused, both in the lateral direction and in the elevation direction, at progressively increasing depths along a desired scan line. Initially, a near field active receive aperture 40 comprising a selected number of transducer elements near the center of aperture 14 is utilized for near field focusing. The near field aperture 40 may, for example, include about half of the total number of transducer elements. The near field aperture 40 has an effective elevation dimension that is relatively small, since only the transducer elements near the center of aperture 14 are included in near field aperture 40. While the elevation dimension varies somewhat over the width of near field aperture 40, an effective elevation dimension intermediate between the maximum and minimum elevation dimensions can be defined. The near field aperture 40 produces a receive beam pattern 46, as shown in FIG. 2, in the elevation direction with a shallow focal point 48 and rapid divergence beyond the focal point 48. However, when ultrasound energy is being received from depths corresponding to focal point 48, the receive beam is focused, and a high quality image is obtained in the near field.

The active receive aperture is dynamically increased with time from near field aperture 40 to a far field active receive aperture, which may include the full aperture 14 or less than the full aperture 14. The active receive aperture is dynamically increased by successively adding transducer elements to the aperture. One intermediate beam pattern 57 as the aperture grows is shown by dashed lines in FIG. 2. As the active receive aperture is increased in width, it also increases in effective elevation dimension because of the shape of aperture 14 as described above. The increase in effective elevation dimension of the active receive aperture causes the focal point in the elevation direction to increase in depth. A receive beam pattern 54 in the elevation direction for the far field aperture 14 is shown in FIG. 2. The far field aperture 14 has a relatively deep focal point 56. The receive beam pattern 54 diverges relatively slowly at focal depths beyond focal point 56. Thus, the far field aperture 14 can be used for focal depths at or greater than the depth of focal point 56. It can be seen that the height of the beam pattern 54 at a depth corresponding to focal point 48 is relatively large. Thus, in the absence of dynamic elevation focusing, the receive beam pattern would not be focused at shallow depths, and image quality would be degraded.

Dynamic elevation focusing has been described above in connection with the bowtie transducer configuration. Dynamic elevation focusing occurs because of the variation in effective elevation dimension of the transducer as the active receive aperture is increased in width. It will be understood that dynamic receive focusing in the lateral and elevation directions are effected simultaneously. Dynamic receive focusing in the lateral direction utilizes known techniques of dynamically varying the delays applied to the received signals from each transducer element so that the receive beam is dynamically focused along a scan line at a selected steering angle. As a result, the receive beam is dynamically focused both in elevation and in the lateral direction so as to produce a better focused receive beam over the range from the near field to the far field. The process is repeated for a prescribed number of scan lines, and the received signals are processed to produce an ultrasound image. By having a more focused receive beam at all focal depths of interest, a high quality image is obtained.

Figure 3:
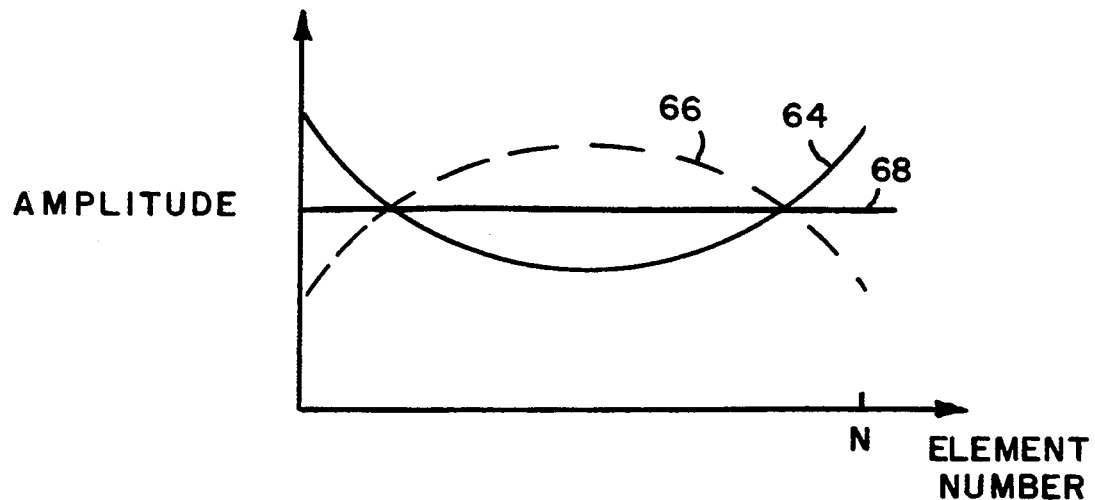
FIG. 3 is a graph that illustrates compensation for the lateral apodization of the ultrasound transducer of FIG. 1A.

Referring again to FIG. 1A, it can be seen that the transducer elements near the ends of aperture 14 will transmit more ultrasound energy for a given electrical excitation than transducer elements near the center of aperture 14 because the outer transducer elements have larger surface areas. Similarly, the outer transducer elements have greater sensitivity in the receive mode than transducer elements near the center of aperture 14 because of their larger surface areas. This effect is illustrated in FIG. 3 by curve 64, which represents either the transmitted ultrasound intensity or the received signal amplitude as a function of transducer element in the lateral direction. The variation represented by curve 64 is an inherent characteristic of the transducer shape and may be referred to as transducer lateral apodization. The result of the variation illustrated by curve 64 is to somewhat degrade the lateral transmit and receive beam patterns as compared with a rectangular transducer array. While the main beam is somewhat narrower for the bowtie transducer, the sidelobes are increased. As known in the art, this is an undesirable condition.

In accordance with a further feature of the invention, the degradation of beam pattern is overcome using electronic compensation for the transducer lateral apodization illustrated by curve 64. Specifically, electronic compensation is used to control the transmitted ultrasound energy, the received signals, or both for each transducer element to produce a desired lateral apodization profile. The electronic compensation as a function of transducer element to produce a constant lateral apodization profile, typically by gain control, is illustrated in FIG. 3 by curve 66. It can be seen that the electronic compensation of curve 66 is essentially the inverse of the transducer lateral apodization function of curve 64. Thus, the electronic compensation produces little or no attenuation of the transmitted and/or received signal near the center of aperture 14 and produces the greatest attenuation of the transmitted and/or received signals at the ends of aperture 14. The shape of the electronic compensation curve 66 can be tailored to produce a resulting lateral apodization profile 68 that is constant across the elements of the transducer, or that has any other desired shape. Furthermore, different electronic compensation curves will be required for different aperture shapes. It will be understood that an additional apodization function, such as that used for dynamic receive focusing, can be superimposed on the resulting lateral apodization profile 68. Furthermore, the apodization profiles can be changed as a function of depth. Preferably, the electronic compensation for each transducer element is determined in accordance with the ratio of center element elevation dimension to the new element elevation dimension. By utilizing electronic compensation of the transmitted and/or received signals, the lateral beam patterns of the bowtie transducer can be made essentially equivalent to those produced by a rectangular transducer.

Figure 4:
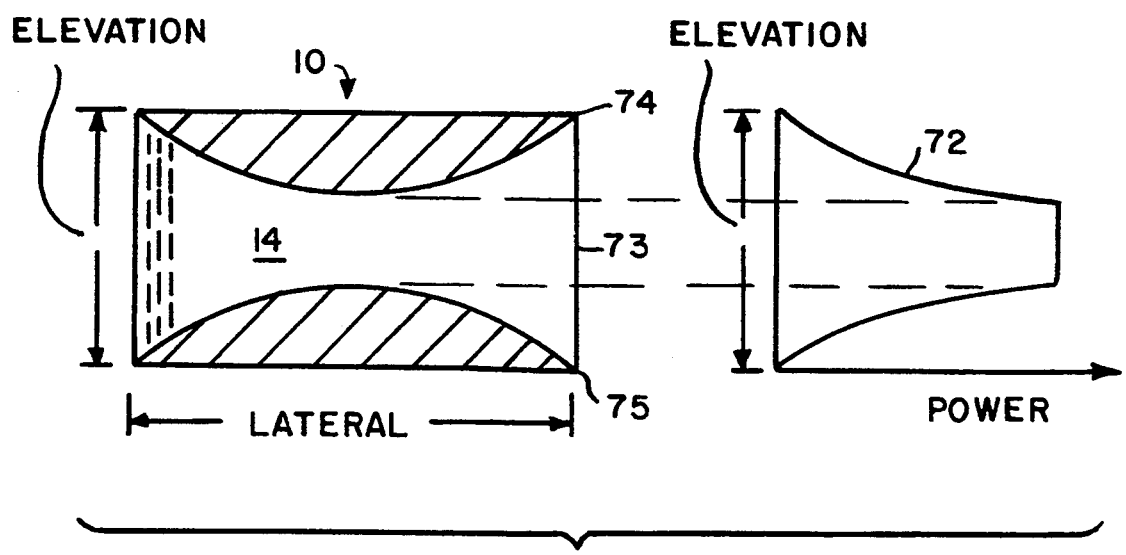
FIG. 4 is a graph that illustrates the apodization profile in the elevation direction of the ultrasound transducer of FIG. 1A.

The bowtie elevation apodization profile is illustrated in FIG. 4 by curve 72. The apodization profile 72 in the elevation direction is beneficial in reducing elevation sidelobes due to its smooth transition from center aperture 73 with full power to end apertures 74 and 75 with reduced power.

Figure 5:
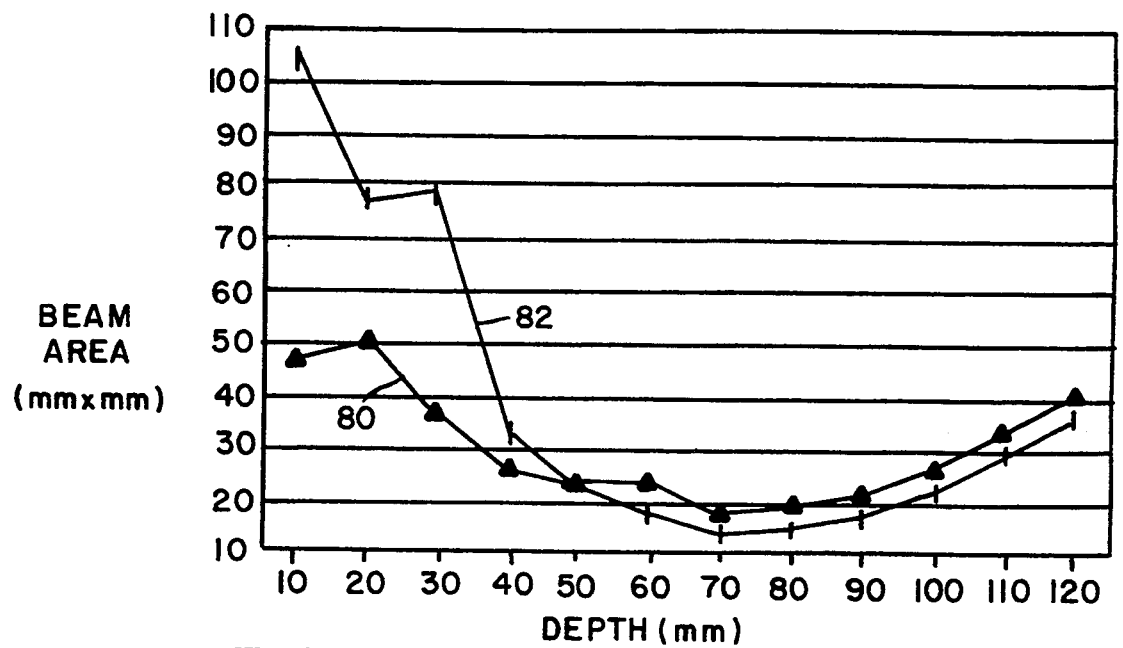
FIG. 5 is a graph of measured beam area as a function of depth for the ultrasound transducer of FIG. 1B and for a prior art ultrasound transducer.

A comparison of the measured beam area of a bowtie ultrasound transducer in accordance with the present invention and a prior art rectangular transducer having the same dimensions but without regions 36 and 38 covered by a blocking material is shown in FIG. 5. Beam area in square millimeters is plotted as a function of depth. The boundary of the beam area is defined as the locus of points where the beam intensity is 20 dB down from its maximum value. Curve 80 represents the performance of a bowtie transducer having 96 transducer elements varying from 8 mm in elevation dimension at the center to 12 mm at the ends. Curve 82 represents the performance of a rectangular transducer having 96 elements and a constant 12 mm elevation dimension. The rectangular transducer had a fixed elevation focus, whereas the bowtie transducer was utilized with dynamic elevation focusing as described above. From curve 80 in FIG. 5, it can be seen that the area of the near field beam pattern produced by the bowtie transducer is substantially less than the area of the beam pattern produced by the rectangular transducer. The smaller area beam is more focused and results in improved near field image quality. At depths greater than about 6 cm, the bowtie transducer produces a beam pattern with a slightly greater area than the rectangular transducer. However, it has been found that this difference does not significantly affect image quality in the far field.

Figure 7:
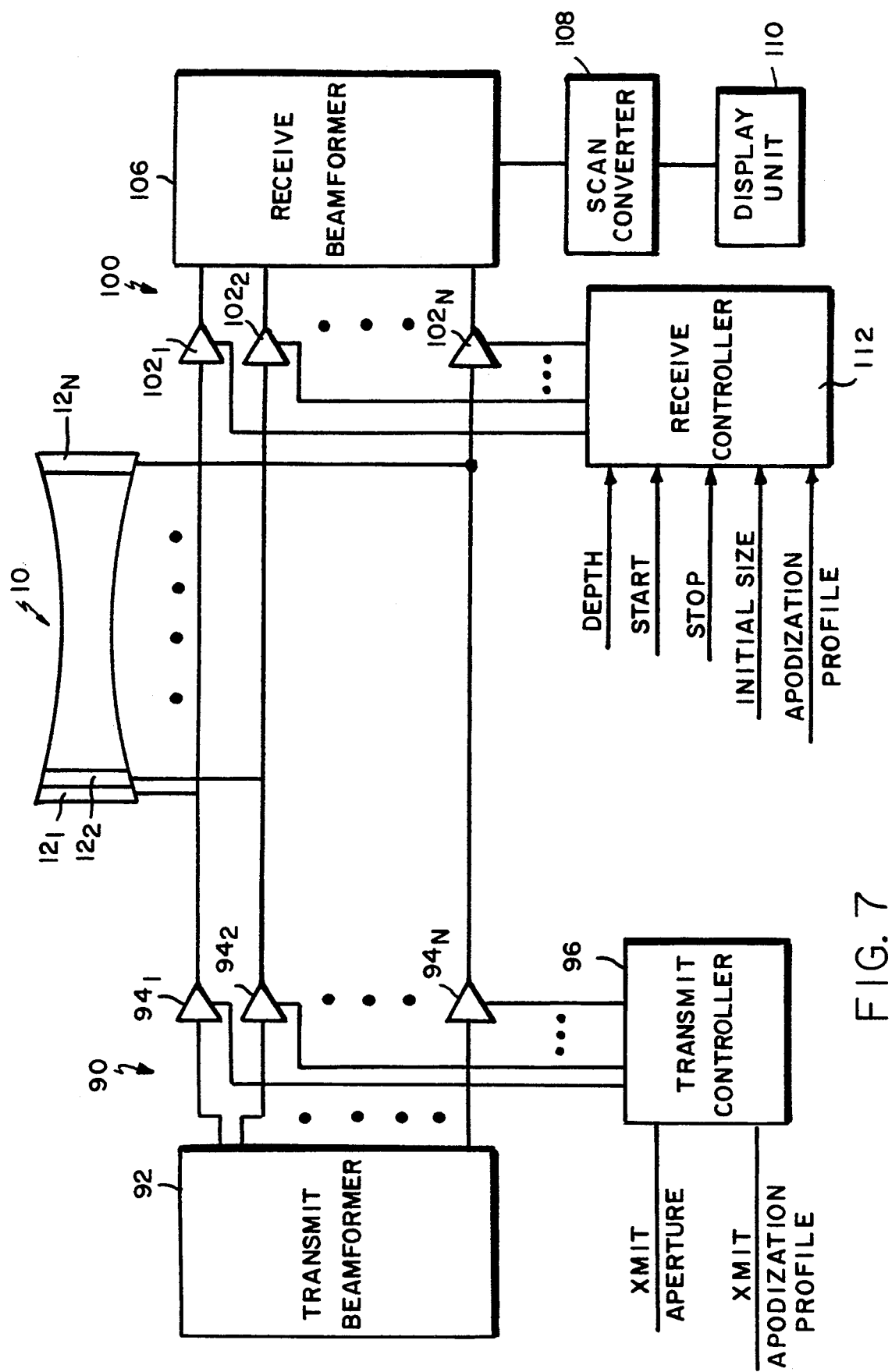
FIG. 7 is a block diagram of a phased array ultrasound imaging system incorporating the present invention.

A simplified block diagram of an ultrasound imaging system incorporating a bowtie transducer is shown in FIG. 7. A transmitter 90 includes a transmit beamformer 92 and variable gain amplifiers $94_1, 94_2, \ldots 94_N$. One of the variable gain amplifiers corresponds to each of the elements $12_1, 12_2, \ldots 12_N$ of the transducer 10. The transmitter outputs are coupled through a transmit/receive switch (not shown), as known in the art, to the respective elements of transducer 10. The transmitter 90 energizes selected elements of transducer 10 to transmit ultrasound energy into an object being imaged. Appropriate delays are applied to the transmitted ultrasound pulses by the transmit beamformer 92 so that the ultrasound energy is directed at a desired steering angle and is focused at a desired focal depth. The variable gain amplifiers $94_1, 94_2, \ldots 94_N$ are controlled by a transmit controller 96. The transmit controller 96 applies a gain control signal to each variable gain amplifier so as to control the transmit lateral apodization profile and the transmit lateral aperture. Channels outside the transmit lateral aperture are disabled and do not transmit ultrasound energy.

The reflected ultrasound energy from various structures within the object being imaged is converted by each element of transducer 10 to electrical signals which are applied to inputs of a receiver 100 including variable gain amplifiers $102_1, 102_2, \ldots 102_N$ and a receive beamformer 106. The outputs of the variable gain amplifiers are applied to the receive beamformer 106. The receive beamformer 106 delays the received signal from the respective transducer elements. The delayed signals are summed to form a signal representative of a receive beam at a desired steering angle. The system typically performs a sector scan. A sector scan pattern comprises a plurality of scan lines originating from a single point, typically located at the center of the transducer. The receive beamformer output is applied to a scan converter 108 which converts the sector scan to an XY image format. The output of scan converter 108 is applied to a display unit 110, such as a video display monitor. The receive beamformer 106, the scan converter 108 and the display unit 110 are known in the art. Examples of these units can be found, for example, in the Sonos 1000 ultrasound imaging system manufactured and sold by Hewlett-Packard Company.

The variable gain amplifiers $102_1, 102_2, \ldots 102_N$ are controlled by a receive controller 112. The receive controller 112 applies a gain control signal to each variable gain amplifier so as to electronically compensate for the transducer lateral apodization profile and produce a resulting lateral apodization profile of desired shape. For the bowtie transducer, the controller 112 reduces the gain of amplifiers corresponding to transducer elements near the ends of transducer 10 relative to the gain of amplifiers corresponding to elements near the center of transducer 10. Alternatively or in addition to the compensation applied by the variable gain amplifiers, the transmitter 90 can apply lower amplitude energizing signals to the transducer elements near the ends of transducer 10 relative to the energizing signals applied to elements near the midpoint of transducer 10, by controlling the gain of variable gain amplifiers $94_1$, $94_2$, . . . $94_N$. Both of these apodization profiles can be changed as a function of depth.

The receive beamformer 106 applies delays to the received signals to dynamically focus the receive beam at progressively increasing depths along a desired scan line. The dynamic focus is effected by varying the delays during reception of ultrasound energy so as to increase the focal depth of the receive beam. Furthermore, the receive beamformer 106 dynamically increases the active receive aperture from the initial near field aperture 40 to the far field aperture 14, as shown in FIG. 2. The size of the active receive aperture is determined by the number of transducer elements that contribute to the beamformer output. The received signals from transducer elements outside the desired active receive aperture are disabled or otherwise ignored. The active receive aperture is increased in size by progressively enabling received signals from transducer elements until the far field active receive aperture is reached. The elevation dimension of the active receive aperture automatically increases as the active receive aperture is increased in lateral dimension because of the geometry of the bowtie transducer. Thus, the beam pattern is focused at increasing depths, both in the lateral and elevation directions.

According to a further feature of the invention, the bowtie transducer can be utilized in conjunction with transmit splice techniques, wherein two or more ultrasound beams are sequentially transmitted along a given scan line. The two transmit beams have different focal depths. The received signals from each transmit beam are stored. The received signals in the vicinity of the focal point of each transmit beam are spliced together to form a composite received signal for the scan line. Since the transmitted ultrasound energy is focused both in the near field and the far field, the image quality is improved.

Applying this technique to the bowtie transducer, a first transmit beam is transmitted with a near field active transmit aperture, which may correspond to the near field aperture 40 shown in FIG. 2. This results in the transmitted energy being focused in the near field. Then, a second transmit beam is transmitted with a far field active transmit aperture, which may correspond to the full aperture 14 of transducer 10. This results in the transmitted ultrasound energy being focused in the far field. Received signals from both transmit beams are stored. The received signals in the near field corresponding to the first transmitted beam are combined with the received signals in the far field corresponding to the second transmit beam to produce a composite received signal for the scan line. It can be seen that the active transmit aperture increases in effective elevation dimension as the size of the active transmit aperture is increased. As a result, the transmitted beam is focused at different depths in the elevation direction.

Various techniques can be utilized for fabricating the transducer shown in FIG. 1 and described above. In general, the requirement is to fabricate a transducer wherein the effective elevation dimensions of transducer elements near the center of the transducer are smaller than the effective elevation dimensions of transducer elements near the ends of the transducer. Preferably, the transducer is fabricated as a conventional rectangular transducer, and a layer of ultrasound blocking material of the desired shape defines the upper and lower boundaries of the transducer aperture. The blocking layer is a sheet of thin, acoustically scattering and/or absorbing material capable of substantially blocking ultrasound energy from transmission or reception from the transducer elements. In a preferred embodiment, the material is 3-5 mil thick expanded polytetrafluoroethylene (PTFE), commercially available from W. L. Gore and Assoc. Generally, the blocking material requires a high trapped air content in a random matrix which acts as an acoustic scattering medium.

Figure 6:
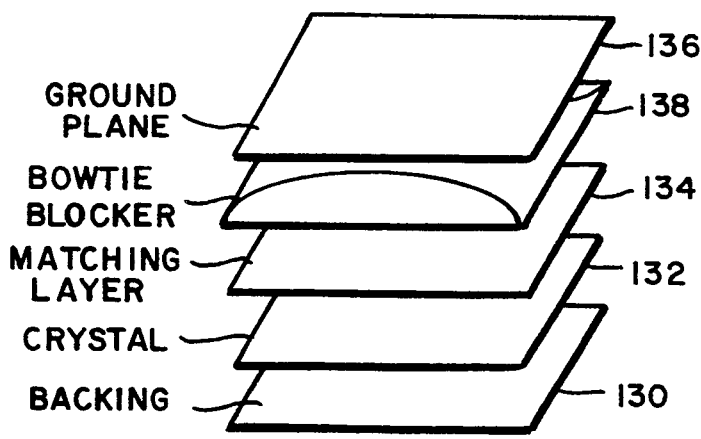
FIG. 6 is an exploded view of the ultrasound transducer of FIG. 1A showing one example of a suitable fabrication technique.

One suitable transducer construction is illustrated in exploded form in FIG. 6. The conventional components of the transducer include a backing layer 130, a transducer crystal 132, a matching layer 134 and a ground plane 136. Portions of the matching layer 132 outside the desired transducer aperture are milled away so as to reduce transmission and reception efficiency of the underlying transducer elements. A blocking layer 138 is then placed in the milled regions to further reduce transmitted and received energy in these regions. The blocking layer 138 is automatically positioned in the recess formed by the milling process.

According to another suitable fabrication technique, the backing layer, the transducer crystal, the matching layer and the ground plane are fabricated in conventional fashion, and the matching layer is not milled. A layer of blocking material cut to the desired shape is placed over the ground plane. Then a mylar barrier is placed over the blocking layer for protection. Additional details regarding the fabrication of an ultrasound transducer having a blocking layer are disclosed in U.S. application Ser. No. 07/871,495, filed Apr. 21, 1992, which is hereby incorporated by reference.

In principle, the dimensions of the transducer elements in the elevation direction could be varied to provide the desired transducer aperture. However, this approach is less desirable than the approaches described above because the impedances of the transducer elements would vary across the transducer aperture, thus requiring impedance matching which varies with transducer element. Techniques for ultrasound transducer shading are described in U.S. Pat. No. 4,460,841.

A third embodiment of an ultrasound transducer in accordance with the invention is illustrated in FIG. 8. A transducer 150 has a central portion with an elevation dimension $h_1$ and regions 154 and 156 at opposite ends thereof with an elevation dimension $h_2$ that is larger than $h_1$. The transducer 150 has step increases in elevation dimension between central region 152 and end regions 154 and 156. It will be understood that more than one step in elevation dimension can be utilized between the center and each end of the transducer.

A fourth embodiment of an ultrasound transducer in accordance with the invention is illustrated in FIG. 9. A transducer 160 has a central portion with an elevation dimension $h_3$ and opposite ends with an elevation dimension $h_4$ that is larger than $h_3$. The elevation dimension of the transducer 160 increases linearly between the central portion and opposite ends.

As indicated above, the transducer of the present invention can utilize a combination of the aperture shapes shown and described herein. For example, the upper and/or lower boundary of the transducer aperture can be smoothly curved as shown in FIGS. 1A and 1B, can have steps as shown in FIG. 8 and can vary linearly as shown in FIG. 9. Also, the transducer aperture may have portions of constant elevation dimension as shown in FIGS. 1B and 8. Finally, the upper and lower boundaries of the transducer aperture may have different shapes.

The operation of the transducers 150 and 160 is substantially the same as the operation of transducer 10 described above. An active receive aperture with a small effective elevation dimension is used for near field reception of ultrasound energy, and the full aperture, having a larger effective elevation dimension, is used for far field reception of ultrasound energy. Thus, dynamic elevation focusing is provided. Transmit/splice techniques as described above can also be employed with the transducers 150 and 160 shown in FIGS. 8 and 9.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A phased array ultrasound transducer comprising:
a plurality of transducer elements disposed along a lateral axis, said transducer having an aperture with an elevation dimension parallel to an elevation axis that increases between a midpoint of the aperture along said lateral axis and each end of the aperture along said lateral axis.

2. A phased array ultrasound transducer as defined in claim 1 wherein the elevation dimension of said aperture increases continuously between the midpoint of said aperture along said lateral axis and each end of said aperture along said lateral axis.

3. A phased array ultrasound transducer as defined in claim 1 wherein the elevation dimension of said aperture increases in one or more steps between the midpoint of said aperture along said lateral axis and each end of said aperture along said lateral axis.

4. A phased array ultrasound transducer as defined in claim 1 wherein said aperture has a smoothly-curved upper boundary and a smoothly-curved lower boundary, said elevation dimension being defined between said upper and lower boundaries.

5. A phased array ultrasound transducer as defined in claim 4 wherein the upper and lower boundaries of said aperture are arc-shaped.

6. A phased array ultrasound transducer as defined in claim 1 wherein the elevation dimension of said aperture increases over a first portion of the aperture and is constant near each end of said aperture.

7. A phased array ultrasound transducer as defined in claim 1 wherein the elevation dimension of said aperture increases linearly between the midpoint of said aperture along said lateral axis and each end of said aperture along said lateral axis.

8. A phased array ultrasound transducer as defined in claim 1 wherein said aperture has an upper boundary and a lower boundary, said elevation dimension being defined between said upper and lower boundaries, the upper and lower boundaries of said aperture being continuously curved near the center of said aperture, said elevation dimension being constant near each end of said aperture.

9. A phased array ultrasound scanner comprising:
a phased array ultrasound transducer including a plurality of transducer elements disposed along a lateral axis, said transducer having an aperture with an elevation dimension parallel to an elevation axis that increases between a midpoint of the aperture along said lateral axis and each end of the aperture along said lateral axis;
a transmitter for transmitting ultrasound energy with said transducer along a transmit line; and
a receiver for receiving reflected ultrasound energy with an active receive aperture of said transducer and for forming a receive beam.

10. A phased array ultrasound scanner as defined in claim 9 wherein said receiver includes means for dynamically increasing the number of said transducer elements in said active receive aperture such that said active receive aperture effectively increases in elevation dimension and said receive beam is dynamically focused in elevation during reception of reflected ultrasound energy from progressively increasing depths.

11. A phased array ultrasound scanner as defined in claim 9 wherein said transmitter includes means for transmitting ultrasound energy with a first active transmit aperture of said transducer at a first focal depth and for transmitting ultrasound energy with a second active transmit aperture of said transducer at a second focal depth, said second active transmit aperture having a larger number of transducer elements and a larger effective elevation dimension than said first active transmit aperture.

12. A phased array ultrasound scanner as defined in claim 9 wherein said receiver includes means for electronically reducing received signals from transducer elements near each end of said aperture relative to received signals from transducer elements near the midpoint of said aperture.

13. A phased array ultrasound scanner as defined in claim 9 wherein said transmitter includes means for electronically reducing transmitted ultrasound energy from transducer elements near each end of said aperture relative to transmitted ultrasound energy from transducer elements near the midpoint of said aperture.

14. A phased array ultrasound scanner as defined in claim 9 wherein the elevation dimension of said aperture increases continuously between the midpoint of said aperture and each end of said aperture.

15. A phased array ultrasound scanner as defined in claim 9 wherein the elevation dimension of said aperture increases in one or more steps between the midpoint of said aperture and each end of said aperture.

16. A phased array ultrasound scanner as defined in claim 9 wherein said aperture has an arc-shaped upper boundary and an arc-shaped lower boundary.

17. A phased array ultrasound scanner as defined in claim 9 wherein the elevation dimension of said aperture increases continuously over a portion of said aperture near the midpoint thereof and is constant over portions of said aperture near each end thereof.

18. A phased array ultrasound scanner as defined in claim 9 wherein the elevation dimension of said aperture increases linearly between the midpoint of said aperture along said lateral axis and each end of said aperture along said lateral axis.

19. A phased array ultrasound scanner comprising:

a phased array ultrasound transducer including a plurality of transducer elements disposed along a lateral axis, said transducer having an aperture with an elevation dimension parallel to an elevation axis that increases between a midpoint of the aperture along said lateral axis and each end of the aperture along said lateral axis;

a transmitter for transmitting ultrasound energy with said transducer; and a receiver for receiving reflected ultrasound energy with an active receive aperture of said transducer and for forming a receive beam, said receiver including means for dynamically increasing said active receive aperture during reception of reflected ultrasound energy from progressively increasing depths such that said active receive aperture effectively increases in elevation dimension.

20. A phased array ultrasound scanner as defined in claim 19 wherein said receiver includes means for electronically compensating for the variation in areas of said transducer elements between midpoint of said aperture and the ends of said aperture.

* * * * *